(12) United States Patent
Bauer et al.

(10) Patent No.: US 10,283,924 B2
(45) Date of Patent: May 7, 2019

(54) METHOD AND DEVICE FOR CONNECTING AN ELECTRICAL CONDUCTOR TO AN ELECTRICAL CONTACT PART

(71) Applicants: Audi AG, Ingolstadt (DE); Schäfer Werkzeug—und Sondermaschinenbau GmbH, Bad Schönborn-Langenbrücken (DE)

(72) Inventors: Hans Bauer, Rednitzhembach (DE); Markus Schäfer, Bad Schönborn (DE); Hansjörg Wolff, Leingarten (DE)

(73) Assignees: Audi AG, Ingolstadt (DE); Schäfer Werkzeug—und Sondermaschinenbau GmbH, Bad Schönborn-Langenbrücken (DE)

( * ) Notice: Subject to any disclaimer, the term of this patent is extended or adjusted under 35 U.S.C. 154(b) by 438 days.

(21) Appl. No.: 14/902,049

(22) PCT Filed: Jun. 14, 2014

(86) PCT No.: PCT/EP2014/001616
§ 371 (c)(1),
(2) Date: Dec. 30, 2015

(87) PCT Pub. No.: WO2015/000550
PCT Pub. Date: Jan. 8, 2015

(65) Prior Publication Data
US 2016/0372881 A1    Dec. 22, 2016

(30) Foreign Application Priority Data

Jul. 1, 2013    (DE) .......... 10 2013 010 981

(51) Int. Cl.
*H01R 43/048*    (2006.01)
*H01R 4/18*    (2006.01)
(Continued)

(52) U.S. Cl.
CPC ....... *H01R 43/048* (2013.01); *B23K 26/0622* (2015.10); *B23K 26/20* (2013.01);
(Continued)

(58) Field of Classification Search
CPC ........ H01R 4/18; H01R 43/02; H01R 43/048; H01R 4/184; H01R 4/187; H01R 43/0221;
(Continued)

(56) References Cited

U.S. PATENT DOCUMENTS 4,913,678 A    4/1990  Avellino et al.
4,966,565 A *  10/1990 Dohi ..................... H01R 4/029
                                                                439/874
(Continued)

FOREIGN PATENT DOCUMENTS

DE    30 17 364 A1    11/1981
DE    42 00 492 A1    4/1993
(Continued)

OTHER PUBLICATIONS

English Translation of Japanese Office Action dated Nov. 14, 2017 in connection with Japanese Application No. 2016-522306.
(Continued)

*Primary Examiner* — Carl Arbes
(74) *Attorney, Agent, or Firm* — Wolf, Greenfield & Sacks, P.C.

(57) ABSTRACT

The present invention relates to a method for connecting an electrical conductor (12) to an electrical contact part (14), which has a base part (16) and deformable flanks (18) connected thereto, wherein the flanks (18) are deformed by means of a device, which has a bending punch (26) and a resting region (24) for at least one section of the base part (16) of the electrical contact part (14), by means of the bending punch (26) in such a way that said flanks (18)

(Continued)

compress the electrical conductor (12) with the contact part (14) in a force-fitting manner, wherein, at least within a lower dead center time period of the bending punch (26), the contact part (14), which is arranged at least partially between the resting region (24) and the bending punch (26), is acted upon through the resting region (24) in such a way that at least one component (20) of the electrical conductor (12) is cohesively connected to the base part (16) and/or at least one flank (18). The present invention also relates to a device designed for the method according to the invention.

4 Claims, 2 Drawing Sheets

(51) Int. Cl.
| | |
|---|---|
| *H01R 43/02* | (2006.01) |
| *B23K 31/00* | (2006.01) |
| *B23K 26/70* | (2014.01) |
| *B23K 26/0622* | (2014.01) |
| *B23K 26/21* | (2014.01) |
| *B23K 26/20* | (2014.01) |
| *B23K 26/57* | (2014.01) |
| *B23K 101/38* | (2006.01) |

(52) U.S. Cl.
CPC .............. *B23K 26/21* (2015.10); *B23K 26/57* (2015.10); *B23K 26/702* (2015.10); *B23K 31/003* (2013.01); *H01R 4/184* (2013.01); *H01R 4/187* (2013.01); *H01R 43/0221* (2013.01); *B23K 2101/38* (2018.08)

(58) Field of Classification Search
CPC .... B23K 26/0622; B23K 26/20; B23K 26/21; B23K 26/57; B23K 26/702; B23K 31/003; B23K 2101/38
See application file for complete search history.

(56) References Cited

U.S. PATENT DOCUMENTS

| | | | |
|---|---|---|---|
| 5,269,056 A | 12/1993 | Yang et al. | |
| 5,300,755 A * | 4/1994 | Nishitani | B23K 26/22 219/121.63 |
| 5,451,736 A | 9/1995 | Fiedler et al. | |
| 5,808,260 A | 9/1998 | Asakura et al. | |
| 5,961,348 A | 10/1999 | Murphy | |
| 6,193,138 B1 | 2/2001 | Wada | |
| 6,531,676 B2 | 3/2003 | Schwemmer et al. | |
| 6,697,675 B1 | 2/2004 | Safarevich et al. | |
| 6,813,826 B2 * | 11/2004 | Ito | H01R 43/058 29/748 |
| 7,008,273 B2 | 3/2006 | Zhou | |
| 7,033,233 B2 * | 4/2006 | Fujimoto | B23H 11/006 439/874 |
| 7,705,265 B2 * | 4/2010 | Asakura | H01R 43/0221 219/121.64 |
| 9,325,135 B2 | 4/2016 | Bauer et al. | |
| 2006/0057903 A1 | 3/2006 | Asakura et al. | |
| 2010/0105256 A1 | 4/2010 | Lyford et al. | |
| 2014/0144016 A1 * | 5/2014 | Bauer | B23K 26/22 29/863 |

FOREIGN PATENT DOCUMENTS

| | | |
|---|---|---|
| DE | 196 51 513 A1 | 6/1997 |
| DE | 198 40 214 A1 | 3/1999 |
| DE | 100 07 258 A1 | 8/2001 |
| DE | 103 52 482 A1 | 6/2005 |
| DE | 10 2004 053 126 A1 | 5/2006 |
| DE | 103 58 153 A1 | 1/2008 |
| DE | 10 2007 032 584 B4 | 11/2008 |
| DE | 10 2010 035 424 A1 | 3/2012 |
| GB | 2 341 497 A | 3/2000 |
| JP | 19760033885 D2 | 3/1976 |
| JP | H04 95372 A | 3/1992 |
| JP | H04 137380 A | 5/1992 |
| JP | H06 31072 U | 4/1994 |
| JP | 2000-231944 A | 8/2000 |
| JP | 2004-192948 | 7/2004 |
| KR | 10-1042185 B1 | 6/2011 |
| WO | 2012/025235 A1 * | 3/2012 |

OTHER PUBLICATIONS

English translation of Japanese Office Action dated May 9, 2017 in connection with Japanese Application No. 2016-522306.

* cited by examiner

METHOD AND DEVICE FOR CONNECTING AN ELECTRICAL CONDUCTOR TO AN ELECTRICAL CONTACT PART

The invention relates to a method and a device for connecting an electrical conductor with an electrical contact part.

For electronic and electrical components of, for example, the vehicle's electrical system, the connection of the contact parts and electrical conductors (lines) usually occurs via a mechanical, force-fitting connection, the so-called crimping connection. With the crimping method, at least two components are force-fittingly connected with each other by plastic deformation of at least one component. Usually, a contact part has flanks (crimp flanks, legs) which are forcibly pressed with the strands of a cable by squeezing. Here a material connection is not normally achieved. According to the prior art, it is common to obtain a honeycomb-like pressing of the strands in the contact part via a pressing degree of about 20%. In addition, support of the flanks should be achieved to counteract a possible springing back.

The quality control of such crimping connections usually is performed by the so-called crimp force monitoring in which the force which has to be applied for the crimping or bending is measured depending on the bending path. The force integrated over the path results in the performed work, in the crimp force monitoring the difference in work between a crimped contact part without line and a crimped contact part with line being used as a measure for the quality of the crimping connection. A difference in work of about 30% allows diagnosing missing strands of a cable, an insufficient pressing of contact part and line, and changed crimp parameters (for example crimp height).

The crimping methods known from the prior art have two significant disadvantages: At very small line cross-sections (smaller than 0.35 sq. mm) or great sheet thickness of the contact part in the deformed region, the measured work difference is so small that sufficient monitoring of the crimping method is no longer possible. For example, missing strands of a cable can no longer be identified. However, when individual strands of the cable are missing in the crimped region, the pressing degree in the crimp decreases and the electrical contact resistance between the conductor and the contact part can increase to become infinite. As a result, an electrical functionality of the connection is no longer given.

A typical material for the deformable contact part is metal. Since every metal has elastic properties, an insufficient support of the deformed crimp legs can result in an undesired springing back ("breathing") of these flanks. This can lead to deterioration of the contact between the deformed contact part and the conductor, an increase in the electrical resistance between the two components and a decrease in the quality of the crimping connection.

In view of this background, a series of methods and devices have already been suggested or developed for improving the crimping method.

From DE 103 58 153 A1 a connection method is known in which a cable is first crimped together with a contact element and then laser welded with the latter in three individual steps. The crimping and the laser welding are performed in two separate devices and thus also in separate work steps.

DE 10 2004 053 126 A1 discloses a device in which an electrical conductor is crimped together with a contact element and welded in the same work step. The crimp flaps of the contact element are pressed with a special crimping tool. The crimp contact is generated between the sheath of the electrical conductor and the crimp flaps of the contact element, whereas the welding is performed at a different site between a conductor end and the contact element. During welding, an electrical current flows via welding electrodes through the elements of the conductor to be connected and the contact element.

From DE 198 40 214 C2 a method is known for pressure welding by means of which lines between the flaps of a line-holding part are fixed. For this, the lines are first placed into the line-holding part and the one flap thereof is pressed overlappingly under the other flap with the aid of an anvil and a crimp die. Subsequently, the flaps are welded together.

DE 100 07 258 A1 describes a mobile cable connector in which a wire bundle is inserted into a slanted cylindrical metal sleeve. At the slanted insertion opening, the wire bundle is then ultrasonic welded with a side of the sleeve via two electrodes.

DE 103 52 482 A1 describes a device with which the strands of different cables can be welded together. In addition, the device enables crimping of the electrically insulated regions of the cables.

From DE 30 17 364 A1 a method is known in which the strands of a cable are first crimped with a flat plug in that a die stamp presses the metal legs of the flat plug together. The die stamp also serves for ultrasonic welding strands and flat plugs to one another.

From DE 10 2007 032 584 B4 a device is also known for producing crimping connections and welding connections. Here, the crimp of a contact element is first closed about the insulation of a cable, and in a second step the insulated cable end is welded together with the contact.

JP 2000231944 A has as its subject matter an electrical crimp contact element for an electrical conductor, in which the crimp flanks have irradiation openings. Following the crimping process, the contact element and the electrical conductor can be welded together through the irradiation openings by means of a laser beam.

From DE 10 2010 035 424 A1 a method is known for connecting an electrical conductor with a deformable leg having an electrical contact part, the legs being deformable by means of a bending die such that the legs press in a force-fitting manner the contact part, the contact part being acted on in such a way that at least the legs are materially connected with each other. A device is also known from this laid-open document having a bending die for connecting an electrical conductor with an electrical contact part, the contact part having deformable legs and the bending die being configured to deform the legs so that they press the conductor force-fittingly with the contact part, and the device further comprising a laser welding device, the laser welding device being configured to act on the contact part such that at least the legs are materially connected to one another.

It is an object of the present invention to establish a secure connection between an electrical conductor and an electrical contact part and at the same time to overcome disadvantages of the prior art.

These objects are solved by the method according to claim 1 and the device according to claim 7.

According to the invention, a method is proposed for connecting an electrical conductor with an electrical contact part, the contact part having a base part and deformable flanks connected thereto, and the flanks being deformable by means of a device having a bending die and a resting region for at least one section of the base part of the electrical contact part, by means of a bending die such that the legs force-fittingly press the electrical conductor with the contact part.

The method according to the invention is characterized in that at least within a lower dead center time period of the bending die, the contact part, which is arranged at least partially between the resting region and the bending die, is acted on through the resting region in such a way that at least one component of the electrical conductor is materially connected with the base part and/or at least one flank.

Several advantages can be achieved with the method according to the invention. Since the effect on the contact part occurs on the side of the resting region, it is not necessary to modify the bending die usually used for the method. Standard contact parts (standard contacts) can also be used without any modification. Furthermore, the positioning of the contact part is not problematic since there are no strict tolerances which must be maintained. Since the effect occurs during or within the lower dead center time period of the bending die, the effect can also occur cycle time neutrally or nearly cycle time neutrally during the actual crimping process.

According to a first advantageous further development of the method, the effect which causes the material connection occurs via at least one opening in the resting region. And according to a second advantageous further configuration of the method, the material connection is caused by at least one laser beam passing through the at least one opening in the resting region.

Since, as already mentioned above, the effect on the contact part occurs on the side of the resting portion, and no role or only a minor role is awarded to the resting portion when deforming the flanks of the contact part by the bending die, one or several openings can be provided with a comparatively large diameter in the resting portion, i.e. one or a plurality of openings which have a considerably larger diameter than the laser beam(s) used. By this, welding of the contact part on the resting portion can be avoided with the method according to the invention and the quality window can be increased.

According to a third advantageous further development of the method, the electrical conductor is acted on through at least one opening in the base part of the contact part in such a way that at least one component of the electrical conductor is materially connected with the base part and/or at least one flank.

With an effect through at least one opening in the base part of the contact part a material connection can be established, for example, with contact parts having a comparatively great material strength (sheet thickness) in an energy-saving manner between at least one component of the conductor and the base part and/or at least one flank of the contact part without a large amount of material of the base part having to be melted.

According to an advantageous further development of this embodiment of the method, the region on which the laser beam acts has a larger surface than the surface of the opening in the base part, where the surface is to be measured perpendicular to the beam direction of the laser beam when impinging on the region.

By this it can be ensured that the laser beam is also radiated onto material of the base part in the border region of the opening in the base part, by which a material connection can be caused in an energy-saving manner between at least one component of the conductor and the border of the opening of the base part.

There are further advantages if the material connection occurs for a contact part having a longitudinal extension and a transverse extension at least in a partial region that is in the center with regard to the longitudinal extension.

The present invention also comprises a device for connecting an electrical conductor with an electrical contact part, the electrical contact part having a base part and deformable flanks connected thereto, and the device has a resting portion for at least one section of the base part of the electrical contact part, a bending die which is configured to deform the flanks such that the electrical conductor is force-fittingly pressed with the contact portion, and has at least one laser welding device.

The device is characterized in that the at least one laser welding device is configured to act through at least one opening in the resting region on the contact part arranged at least partially between the resting region and the bending die in such a way that at least one component of the electrical conductor is materially connected with the base part and/or at least one flank.

According to a first advantageous further development, the device according to the invention has a controller that is configured to control the start time of the radiation of the laser beam(s), the duration of the emission of the laser beam(s), the energy density of the laser beam(s), a variation of the energy density of the laser beam(s) and/or the dead center time period of the bending die.

According to a second advantageous further development, the device has at least two plungers (anvils) which are replaceable according to preselectable criteria. And according to a third advantageous further development, the device has a cleaning device for cleaning the opening and/or the resting region.

Further features of the invention result from the claims, the figures and the description of the figures. The features and feature combinations mentioned previously in the description and the features and feature combinations mentioned in the description of the figures and/or the features and feature combinations shown in the figures alone are not only usable in the respective combination set forth but also in other combinations or by themselves without departing from the framework of the invention.

The present invention is explained in more detail below by way of the enclosed drawings.

These show.

The views in the figures are purely schematic and are not true to scale. In the figures, identical or similar elements are provided with the same reference numbers.

The embodiment examples explained below constitute preferred embodiments of the present invention. The present invention is obviously not limited to these embodiments.

Figure 1:
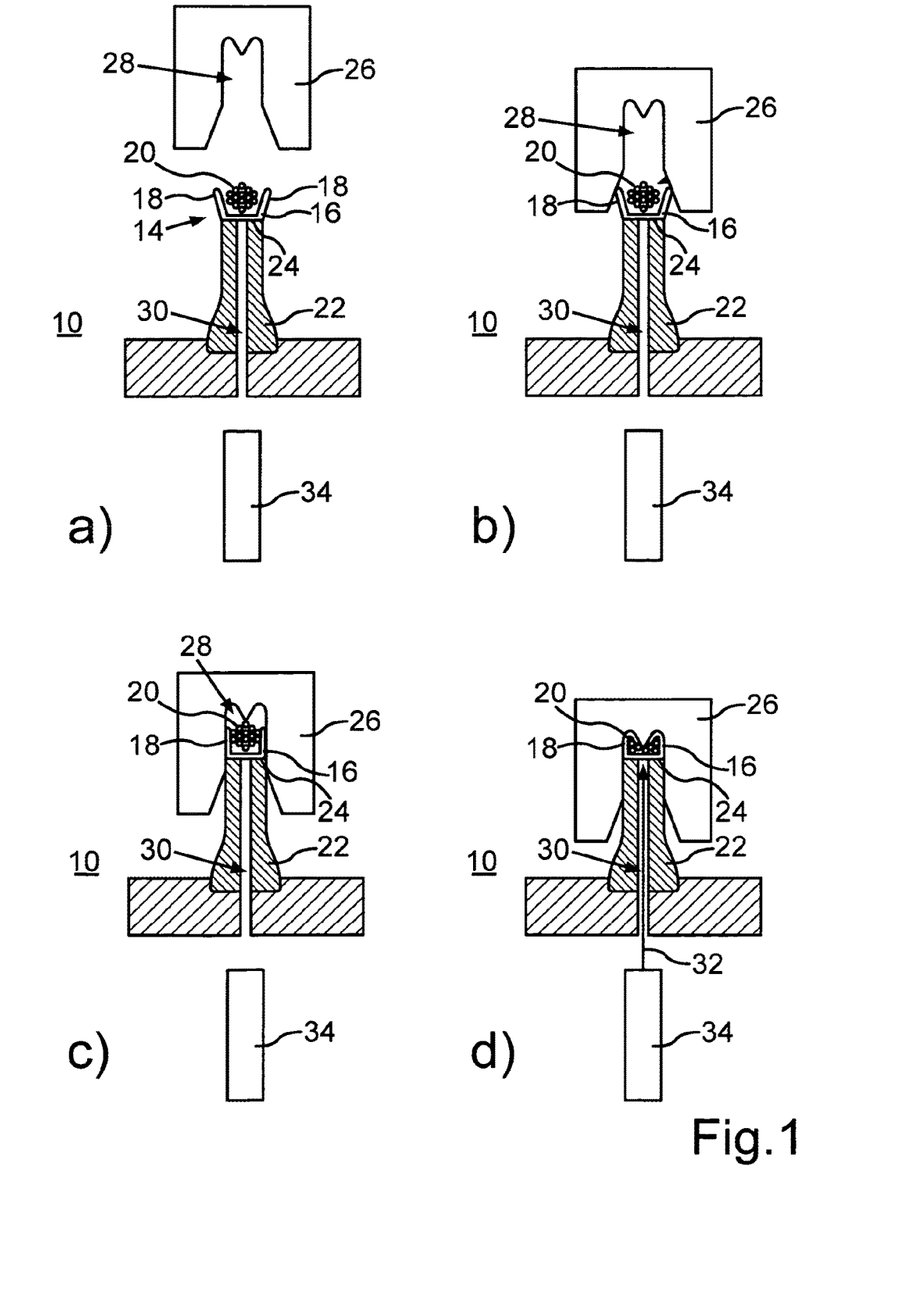
FIG. 1: Schematic sectional views of a device according to the invention for connecting an electrical conductor with an electrical contact part at four different times a) to d) during the course of the connecting method according to the invention.
Figure 4:
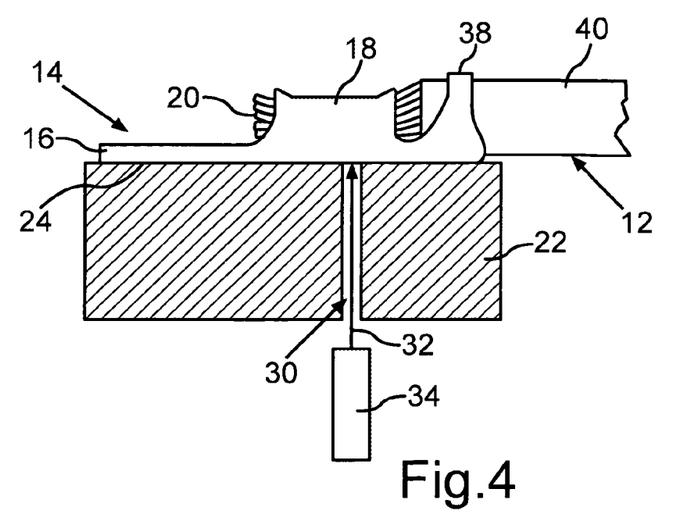
FIG. 4: A schematic side view of an electrical contact part with deformed flanks and force-fittingly pressed strands of a cable arranged on the resting region of the device shown in the sectional view.

As schematically shown in FIG. 1, the method according to the invention uses a device 10 for connecting an electrical conductor 12 with an electrical contact part 14. The electrical contact part 14 that can be used with the device 10 has a base part 16 and deformable flanks 18 connected thereto. The contact part 14 in the embodiment is made of metal (for example copper) and has flanks 18 opposing each other in pairs. The component(s) 20 of the conductor 12 is/are loosely inserted between the flanks 18. The electrical conductor 12 in the embodiment example is a cable with a plurality of individual conductors or strands as components 20. As shown in FIG. 4, the electrical conductor 12 has an electrically insulating sheath 40 which is removed in an end region of the electrical conductor 12 for the crimping process. In the embodiment example, the strands 20 are made of an electrically conducting metal. Strands 20 are often not insulated wires, however they can also have an electrically insulating sheath. The present method is not limited, however, to electrical conductors 12 with a plurality of individuals conductors, but instead the electrical conductor 12 can also have only one or two individual conductors as component(s) 20. In particular at time (a) of FIG. 1, a permanent connection has not yet been established between the contact part 14 and the strands 20 of the conductor 12.

The device 10 comprises in particular a plunger (anvil) 22 on which the contact part 14 rests, with at least one section of its base part 16 lying on the resting region 24 of the plunger 22. The device 10 further comprises a bending die 26 which is configured as a counterpiece to the plunger 22. This makes it possible for at least a partial region of the plunger 22 to be inserted into a recess 28 of the bending die 26. Plunger 22 and bending die 26 accurately operate together as piece and counterpiece. The bending die 26 is also designated as a crimper and as a rule is made of metal. This is thus usually a wearing part which must be replaced after frequent repetition of the connecting method according to the invention. The same applies to the anvil (plunger) 22.

The bending die 26 is configured such that with it deformable flanks 18 of the electrical contact part 14 can be deformed such that they force-fittingly press all components 20 of an electrical conductor 12 with the contact part 14. The bending die 26 is configured in particular such that it deforms the flanks 18 of the contact part 14 in a predetermined and controlled manner.

The method is applicable in particular to contact parts 14 which are made of metal and which have lateral flank regions 18 in the form of metal flaps or metal legs which can be bent. The flanks 18 of a contact part 14 can be arranged opposite each other in pairs. If an electrical conductor 12 is located between the flanks 18, for example, in the form of strands 20 of a cable, this can be pressed between them during deformation of the flanks 18.

The bending die 26 is configured in particular such that this squeezing or pressing can be carried out particularly effectively. It will have in particular a recess 28 for the contact part 14 and the conductor 12, a force between the contact part 14 and the bending die 26 resulting in that the contact part 14 is deformed by the mechanical resistance of a wall region of the bending die 26 limiting the recess 28. At least one side or surface of the bending die 26 mechanically contacting the contact part 14 or the flank 18 thereof is preferably configured such that by the deforming force a specific end shape of the deformed flanks 18 results. For example, a wall of the bending die 26 can be suitably shaped for this, for example semi-circular shaped.

To connect the contact part 14 with the conductor 12, the plunger 22 and bending die 26 move towards each other such that the plunger 22 accurately penetrates the recess 28. The plunger 22 supports the contact part 14 resting on it with the conductor 12. The bending die 26 is then moved perpendicularly towards the plunger 22 (see time (b) in FIG. 1).

At a time (c) according to FIG. 1, the plunger 22 is penetrated so far into the recess 28 that the flanks 18 of the contact part 14 contact the lower side of the bending die 26. During further movement towards each other of the plunger 22 and bending die 26, a force is then countered by the flanks 18.

If force is further exerted on the plunger 22 and/or the bending die 26, a deformation of the flanks 18 occurs. Depending on the duration of the force as well as the extent of the deformation, the resulting deformation of the flanks 18 is of a plastic nature. By suitably configuring the upper end of the recess 28 of the bending die 26, the flanks 18 are deformed in a controlled and predefined manner. In the embodiment example, the upper end of the recess 28 has two semi-circular curvatures, the flanks 18 of which follow during deformation such that they virtually curl.

Figure 2:
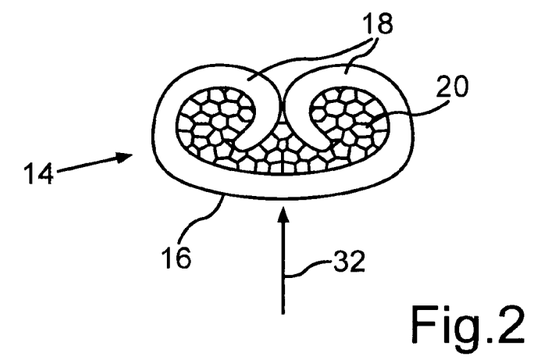
FIG. 2: A schematic sectional view through an electrical contact part with deformed flanks and force-fittingly pressed strands of a cable.

In FIG. 2 a contact part 14 is shown with deformable flanks 18, as it is configured at timed according to FIG. 1 of the method. The flanks 18 formed on opposing sides of the contact part 14 are bent in a spiral shape by the defined force and meet each other in the center. The strands 20 of the conductor 12 formerly located loosely in the contact part 14 are force-fittingly pressed with the contact part 14. To a certain extent this is a press contact that was established by selectively squeezing the flanks 18. By intimately juxtaposing the strands 20 among each another and with the contact part 14, a good electrical contact can be established between all of the elements pressed in this way.

Purely force-fitting pressing is also designated as crimping or flanging. However, the flanks 18 can also in part spring back elastically in the direction of their starting position such that the force-fitting connection with the strands 20 is lost. By this, an electrical contact possibly provided between the conductor 12 and the contact part 14 can also be made poorer or even interrupted.

Therefore, the method according to the invention provides as a further step that at least within a lower dead center time period of the bending die 26 (time (d) according to FIG. 1), the contact part 14 arranged at least partially between the resting region 24 of the plunger 22 and the bending die 26 is acted on through the resting region 24 such that at least one component 20 (e.g. strand(s), individual conductor) of the electrical conductor 12 is materially connected with the base part 16 and/or at least one flank 18 of the electrical contact part 14.

The dead center of the bending die 26 is given if the plunger 22 is penetrated deepest into the recess 28 of the bending die 26. The flanks 18 are then maximally deformed and closed as best possible around the strands 20. Since in the lower dead center force can still be exerted on the contact part 14, the flanks 18 cannot elastically spring back. The strands 20 and the electrical contact part 14 thus have the best possible force-fitting connection at the dead center or during the dead center time period of the bending die 26.

For the effect, preferably a plunger or anvil 22 is used which has at least one opening 30. Through the at least one opening 30, the contact part 14 can be acted on in such a way that at least one component 20 (for example a strand of a cable) of the electrical conductor 12 is materially connected with the base part 16 and/or at least one flank 18 of the contact part 14. The opening 30 allows applying, for example, a light arc, ultrasound or electrical current to the contact part 14 to establish a material connection.

In particular, however, the at least one opening 30 is suitable as an irradiation opening for a laser beam 32 of a laser device (laser welding device, welding laser) 34. Simple access is created by the opening 30 to the base part 16 of the electrical contact part 14 such that it can easily act on the contact part 14. The opening allows creating a material connection on the contact part 14 while it is still enclosed by the bending die 26. The property of the bending die 26 to produce a force-fitting connection is not negatively affected in this case.

Figure 3:
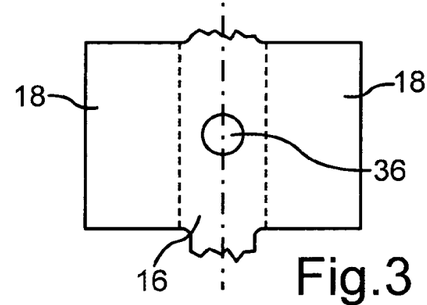
FIG. 3: A schematic plan view of a section of an example of an electrical contact part.

According to a preferred embodiment, an electrical contact part 14 can be used with the method according to the invention, which has at least one opening 36 in the base part 16. An example of such an electrical contact part 14 is schematically shown in FIG. 3.

An electrical conductor 14 can be acted on through the opening 36 of the contact part 14 in such a way that at least one component 20 of the electrical conductor 14 is materially connected with the base part 16 and/or at least one flank 18.

This embodiment is particularly advantageous with larger electrical contact parts 14 having a comparatively great material strength (sheet thickness) at least in the region of the base part 16. Without an opening 36 in the base part 16 of the electrical contact part 14, a comparably high amount of energy would have to act on the base part 16 until the material of the base part 16 fuses to be able to enter into a material connection with at least one component 20 of the electrical conductor 14. The fusing of the material of the base part 16 in such a case would either require a high energy density to enable or maintain short cycle times, or with a lower energy density an increased cycle time would have to be accepted.

Through the at least one opening 36 in the base part (crimp base) 16 of the electrical contact part 14, the energy applied can directly act on the at least one component 20 of the electrical conductor 14 and cause a fusing of this at least one component 20. The fused material of the at least one component 20 of the electrical conductor 14 can then enter into a material connection with the base part 16 and/or at least one flank 18 of the electrical contact part 14, for which, for example, only a melting of the surface of the material of the base part 16 or the flank 18 is required, which can be achieved, for instance, by the temperature of the at least one component 20.

According to a further advantageous embodiment of the variation just described of the method according to the invention, the region on which the effect causing the material bond acts can have a larger surface than the surface of the at least one opening 36 in the base part 16.

For example, such an opening 36 is smaller than the diameter of an applied welding laser beam 32, where the surface is supposed to be measured perpendicular to the beam direction of the laser beam 32 when impinging on the region.

Here, the effect occurs both on the at least one component 20 of the electrical conductor 12 and also on the border region of the opening 36. Through this, the time period for the effect that the adhesive bond causes can be reduced since a laser beam 32 does not first have to fuse the at least one component 20 of the electrical conductor 12 so much that the heat exposure thereof also penetrates to the base part 16. It can then, for example, also be worked with lower laser intensities.

According to another advantageous further configuration of the method according to the invention, the material connection occurs at least in a partial region that is in the center with regard to the longitudinal extension for a contact part 14 with a longitudinal extension and a transverse extension. In particular, the central partial region is a region centrally arranged with regard to the longitudinal extension of the flanks 18 of the contact part 14.

As schematically shown in FIG. 3, the dimensions of the contact part 14 can be characterized by the longitudinal extension thereof (indicated by a dotted line) and the transverse extension thereof. And as schematically shown in FIG. 2, in such a center region strands 20 of a cable are particularly close between the flanks 18. Therefore, the deforming forces that occur there will be particularly high and the flanks 18 will recede preferably elastically.

At the same time, the ends of the bent flanks 18 can be arranged comparatively close to the base part 16. With an effect that occurs such that a material connection takes place at least in a partial region that is in the center with regard to the longitudinal extension, it can be achieved comparatively easily that a material connection is (also) established between at least one component 20 of the electrical conductor 12 and at least one region of the flanks 18. Such an (additional) material connection prevents a springing back of the flanks 18 particularly effectively at this point.

In FIG. 4 a schematic side view of an electrical contact part 14 is shown with deformed flanks 18 and force-fittingly pressed strands 20 of a cable 12 arranged on the resting region 24 of the plunger 22 shown in the sectional view. As shown in the example in FIG. 4, a material connection can be achieved between the material of the electrical contact part 14 and at least one component 20 (in the present example: at least one strand) of the cable 12 by means of a laser beam 32 emitted from the laser beam device 34 that acts on the base part 16 of the electrical contact part 14 through the opening 30 in the plunger 22. In the example shown in FIG. 4, the electrical contact part furthermore has a strain relief 38 that can be configured, for example, by two further flanks of the electrical contact part 14 which by means of the bending die 26 were firmly bent around the cable 12 or the sheath 40 thereof.

The present invention also pertains to a device 10 for connecting an electrical conductor 12 with an electrical contact part 14, the electrical contact part 14 having a base part 16 and deformable flanks 18 connected thereto. The device has a resting region 24 for at least one section of the base part 16 of the electrical contact part 14 and a bending die 26 configured to deform the flanks 18 such that the electrical conductor 12 is force-fittingly pressed with the contact part 14. Regarding said features of the device 10 according to the invention, reference is made to the above statements regarding the device 10 which is suitable for carrying out the method according to the invention.

Further, the device 10 according to the invention has at least one laser device 34 that can emit a laser beam 32 that is suitable for fusing metal. The at least one laser device 34 is configured to act on the contact part 14 arranged at least partially between the resting region 24 and the bending die 26 by at least one opening 30 in the resting region 24 in such a way that at least one component 20 of the electrical conductor 12 is materially connected to the base part 16 and/or at least one flank 18.

The at least one laser device 34 can be configured in an advantageous manner such that a laser beam at least within a lower dead center time period of the bending die 26 acts on the contact part 14 arranged at least partially between the resting region 24 and the bending die 26 through the at least one opening 30 in the resting region 24.

Laser welding is an established and effective method for establishing a material contact. Often short welding periods of, for example, 1 to 2 ms are sufficient to cause an optimal connection in the weld metal. A laser source can also be positioned very flexibly and variably since the laser radiation emitted by the laser source can be very easily guided, for example via mirrors, prisms, glass fibers or other optical components.

The laser device 34 is arranged such that the laser beam 32 emitted by the laser device is irradiated through the opening 30 of the plunger 22. The spatial arrangement of the laser device 34 across from the plunger 22 in the embodiment example of FIG. 1 as well as of FIG. 3 is to be understood only very schematically. The laser device 34 can be arranged randomly across from the plunger 22 as long as its laser beam 32 can be guided in a suitable manner through the opening 30 of the plunger 22.

This can also be achieved in particular via beam-deflecting elements not shown, for example mirrors, prisms or other optimal elements. Other possibilities are conceivable for coupling the laser beam 32. Thus, the laser beam 32 can be guided through the opening 30 by means of a light guide, e.g. a glass fiber. The light guide then runs, for example, through a partial region of the opening 30 or through the entire opening 30. The plunger 22 can also have several openings, each of the openings being able to be allocated a separate laser beam 32. It can also be provided that the laser beam 32 is successively irradiated through different openings. The laser beam 32 can also be irradiated through a selection of openings among a plurality of openings. In particular, a single laser beam 32 can also be split up across several light guides, the individual light guides running into the plunger 22 via the several openings.

The shape of the opening(s) 30 in the plunger 22 is not particularly restricted and can have, for example, a circular cross-section, an oval cross-section, a square cross-section, the shape of an oblong hole and/or the shape of a slit. If several openings 30 are available, the shape and/or the diameter of each opening 30 can be different. The diameter or the cross-section of the opening(s) 30 can be larger on the side opposite the resting region 24 (entry point of the laser beam) than on the side of the resting region 24 of the plunger 22 and can, for example, taper off conically. The size of the opening(s) 30 in the region of the resting surface 24 is not particularly restricted and can have any suitable size, for example a diameter in the range of approximately 0.3 mm to 0.8 mm.

The device 10 is also designated as an applicator. It can, however, alternatively also be provided that the applicator, which comprises the core components bending die 26 and plunger 22, is spatially separated from the laser device 34. In particular, applicators designed as such and the separate laser device 34 can form two individual devices, the combination of which leads to the device 10.

According to a first advantageous further development of the device 10, this has a controller that is not shown, which is adapted to control the start time of the radiation of the laser beam(s) 32, the duration of the radiation of the laser beam(s) 32, the energy density of the laser beam(s) 32, a variation of the energy density of the laser beam(s) 32 during the welding process and/or the dead center time period of the bending die 26.

In most cases it will be sufficient that by means of the controller the starting point and the duration of the radiation of the laser beam(s) 32 are controlled in such a way that the laser beam(s) 32 is/are exclusively emitted during or within a lower dead center time period of the bending die 26.

There are, however, conceivable constellations in which it is advantageous if the start time of the radiation of the laser beam(s) 32 is not in the dead center time period of the bending die 26. Thus, the start time of the radiation of the laser beam(s) 32 is set, for example, at a time shortly before reaching the dead center of the bending die 26, for example to avoid an extension of the dead center time period owing to the requirements of fusing a comparatively large amount of material. If the radiation of the laser beam(s) 32 has already started, for example, shortly before the dead center of the bending die 26, a (first) melting/fusing of the material of the electrical contact part 14 and/or the electrical conductor 12 occurs at the dead center of the bending die. Thus, optionally further radiation of the laser beam(s) 32 within the shortest possible dead center time period of the bending die 26 is sufficient to establish a sufficiently strong material connection.

It can also be sufficient depending on the material and/or material strength of the electrical contact part 14 and electrical conductor 12 as well as the energy density of the laser beam(s) 32 to begin the radiation of the laser beam(s) 32 only after the bending die 26 has already achieved its dead center. Depending on the circumstances, the radiation of the laser beam(s) 32 can also only be sufficient during a part of the dead center time period of the bending die 26.

The energy density of the laser beam(s) 32 can, for example, be changed by a pulse modulation of the laser beam(s) 32. One possibility for setting the energy density is advantageous to be able to achieve an as optimal as possible duration (cycle time neutral) of the effect of the laser beam(s) 32 for the different materials and/or material strengths of the electrical contact part 14 and the electrical conductor 12.

Further, constellations are conceivable in which it is advantageous if the controller is configured to vary the energy density of at least one laser beam according to preselectable criteria for the duration of the radiation of the laser beam(s) 32.

If, for example, the material of the electrical contact part 14 has a higher melting point than the material of the electrical conductor 12, in a first phase of the welding process, for example, a laser beam 32 having a higher energy density can be used and in a second phase of the welding process a laser beam 32 can be used having a lower energy density which is sufficient for melting/fusing the material of the electrical conductor 12.

In a similar manner, a variation of the energy density of the laser beam(s) 32 can be advantageous if, for example, an electrical contact part 14 with a comparatively great material strength and a comparatively thinner electrical conductor 12 are used.

If a laser beam 32 with a sufficiently high energy density is not available or the radiation of a laser beam 32 is not desired at a preselectable energy density such that a sufficiently strong material connection cannot be formed within the shortest possible dead center time period, the length of the dead center time period of the bending die 26 can also be extended in an advantageous manner by means of the controller.

Conversely, within the scope of that which is technically possible, the dead center time period of the bending die 26 can be shortened as required by means of the controller.

According to a second advantageous further development, the device 10 has at least two plungers (anvils) 22 which are replaceable according to preselectable criteria. And according to a third advantageous further configuration, the device 10 has a cleaning device for cleaning the opening 30 and/or the resting region 24.

The method according to the invention and the device 10 according to the invention have the advantage that, for example, in comparison to the methods and devices for forming a material connection by means of a welding process in which a laser beam is irradiated onto a bent flank 18 of an electrical contact part 14, (a) large opening(s) 30 for the laser beam 32 is/are possible.

The background for this is that, for example, with a method in which the laser beam is irradiated through an opening in the bending die 26, the opening for the laser beam must be comparatively small so that the properties of the bending die are not negatively influenced with regard to the defined bending of the flanks 18 required.

If in particular too large an opening is provided in the region of the bending die 26, this can lead during the bending process of the crimp flanks 18 (during curling) to a displacement of the crimp flank material into the hole of the bending die 26 ("formation of warts"). By this, the reflection behavior and/or absorption behavior of the crimp flanks 18 can change and with it also the welding quality. Likewise, with too big an opening in the region of the bending die 26 during the crimping process, at least one edge of the crimp flanks 18 on the border of the opening can "get caught", whereby a compression of the crimp flanks 18 occurs instead of curling.

In the worst case, a welding of the crimp flanks 18 can also occur on the bending die 26. To prevent the "formation of warts", there is the possibility to change the design of the electrical contact part 14, however this would lead to an increase in the price of parts due to the need to create an additional contact variant. Making the hole smaller, however, would increase the probability of welding an electrical contact part 14 or the flanks 18 to the bending die (crimp die) 26.

In contrast to this, based on the present invention, a comparatively large diameter of the opening(s) 30 in the resting region 24 of the plunger 22 can be selected or be present. On the base part 16 of the electrical contact part 14, a relevant bending of material does not take place during the crimping process and, in contrast to the at least two flanks of the electrical contact part 14, the base part 16 of the electrical contact part 14 always rests accurately on the resting region 24 of the plunger 22. Thus, a large diameter of the opening(s) 30 can be selected without this having a negative impact on the actual crimping process or the quality of the crimping process.

With a large diameter of the opening(s) 30, the diameter of the region on which a laser beam 32 acts in the base part 16 of the electrical contact part 14 is considerably smaller than the diameter of the opening(s) 30. By this, the danger of welding the base part 16 to the plunger 22 is considerably reduced as compared to the method described above.

Nevertheless, with the method according to the invention and the device according to the invention a deposition of material can occur in the region of the opening 30 and/or the resting region 24 owing to the welding process (for example by evaporating or spraying). Therefore, the device 10 according to an advantageous further development has at least two plungers (anvils) 22 which are replaceable according to preselectable criteria.

Replacement can occur automatically, for example, after a preselectable number of crimping processes according to the invention, or if an impurity of the resting region 24 and/or an impurity/reduction of the opening 30 is determined by means of sensors suitable therefor.

For the replacement, the at least two plungers 22 could, for example, be mounted on a turntable, and/or there can be a translational slidability of the at least two plungers 22.

According to another advantageous further development, the device 10 can have a cleaning device for cleaning the opening 30 and/or the resting region 24. Such a cleaning device can have, for example, a spindle, a milling cutter or a brush with which it can clean the opening 30 and/or the resting region 24. This cleaning procedure can also obviously be performed automatically, for example, after replacing a plunger 22.

The method according to the invention allows generating a particularly strong, secure and durable connection between the electrical conductor 12 and at least one component 20 of the electrical conductor 12 and the electrical contact part 14. The material connection is established by fusing at least material of the base part 16 and material of the electrical conductor 12. When the fused material solidifies again, this leads to a particularly intimate material (bonded) connection in the fused regions.

The process of materially connecting is in particular a welding process. The source for the laser beam 32 can be such a (welding) laser which emits particularly intense laser radiation 32.

Furthermore, it can be provided to fuse previously independent flanks 18 to a single metal part. In this regard, for example, the performance or duration of the effect can be adapted, which causes the material bond. A material connection can also be established between the flanks 18 of the contact part 14 and the strands 20 of a power cable 12. By this a particularly intense contact can be established and the electrical resistance can be kept low.

The method has the advantage that even thin lines can be securely connected to the contact part 14. With fewer wire cross-sections, an exclusively force-fitting pressing with the contact part 14 is usually not sufficient. The additional material connection allows here for a qualitative improvement of the electrical contact. Thin cables can also be securely connected with the comparatively large contact part 14. Consequently, it is also possible to use thinner wires, which as a whole contributes to a reduction of the weight of the electrical components. Bonds can also be established between such contact parts 14 and wires, in which, according to the prior art, the relation of the wire cross-section to the size of the contact part is unfavorable.

If the material connection is caused by a laser beam 32, it can also be provided with the method according to the invention and with the device according to the invention to measure dimensions which characterize the application of the laser beam 32 onto the contact part 14 and/or the conductor 12. These dimensions provide a measurement for the quality of the material connection. Monitoring the laser welding parameters allows to determine the quality of the established bond. For example, a conventional crimp force monitoring can then be avoided or this can be supplemented by controlling the welding parameters. As already mentioned, the crimp force monitoring frequently fails when wires with few cross-sections and/or contact parts 14 with large sheet thicknesses are connected to each other. Monitoring of the welding parameters allows determination of whether a high-quality welding connection was achieved. Elaborate additional technical measures to ensure the quality of the crimping connection are no longer required. The quality of the achieved connection is sufficiently ensured by measuring, evaluating and monitoring of the laser welding parameters.

Preferably the measured variable is a welding period. As an alternative or in addition, a irradiated intensity of the laser beam 32 can also be measured. As an alternative or in addition, the wavelengths of the radiation with the highest radiation efficiency can also be measured, which are emitted in the range on which the laser beam 32 acts. In the latter case, the temperature can be determined, for example, according to Wien's displacement law, which in turn improves the quality control of the welding process.

The material connecting occurs after a predetermined deformation of the flanks 18 has been achieved via the bending die 26. To achieve a sufficiently force-fitting pressing, it is necessary that the flanks 18 are appropriately deformed by the bending stamp 26. Such a bending can then be defined as predetermined deformation. In particular, the predetermined deformation corresponds to the maximal deformation which is achieved in the respective crimping process. The predetermined deformation can preferably consist of bending flanks 18 opposing each other such that they overlap with each other and/or contact each other.

Through this, it is ensured on the one hand that the force fit between contact part 14 and conductor 12 is optimal and on the other hand the best possible conditions for an effective material bond are given. If, for example, the flanks 18 contact one another, only little material may have to be fused to also achieve a material connection of the flanks 18. By a pronounced deformation, it can also be achieved that the flank material has only minimal elastic properties. An impairment of the quality of the crimping connection by a springing back of the flanks 18 is then avoided.

The device according to the invention can furthermore have a measuring device which is configured to measure variables which characterize the welding laser beam 32. Via such a measuring device, the quality of the welding process is ensured and the material connection achieved therewith.

The device according to the invention can furthermore also have a positioning device which is able to position the laser welding device 34 and/or the contact part 14 in a suitable manner. In particular, the relative arrangement of the laser welding device 34 and the contact part 14 can be adjusted to each other. If the base part 16 of the contact part 14 has at least one opening 36, the location of the contact part 14 can be adjusted via the positioning device such that at least one opening 36 lies in the welding laser beam 32. The positioning device thus makes it possible to aim the laser beam 32 virtually at the opening 36. Thus, the conductor 12 can be directly acted on via the laser beam 32 and, for example, the strands 20 thereof can be fused.

The process of crimping, i.e. bending the flanks 18, takes place over a certain time period: An already crimped contact part 14 is removed from the device 10 and then newly introduced to connecting elements. The time period for a cycle of the crimping process is also influenced by the time span required to press conductor 12 and contact part 14 together. The process of laser welding does not increase or only marginally increases the cycle time of the crimping process. The combined crimping method/welding method is thus cycle time neutral as compared to the pure crimping method. Since per minute, for example, approximately plural 10 to 100 crimping connections can be produced, this is a considerable advantage. Although the crimping connection is improved by the additional welding, the time period required for the entire method does not increase or increases only marginally.

The quality control of the combined crimping and welding method occurs, for example, by monitoring the laser welding parameters according to the prior art. The quality of the force-fittingly produced crimping connection is usually ensured by the fact that the forces occurring during deformation are monitored. Such crimp force monitoring can be supplemented by additional monitoring of the laser welding parameters. This additional quality-control step guarantees that a sufficient connection between contact part 14 and conductor 12 is in fact established. Only a crimp force monitoring would not be able to do this under certain conditions (e.g. unfavorable proportions of the conductor 12 and contact part 14).

A crimping process by integral welding of the crimp contacts (flanks) from above by the bending die (crimp die) by means of a laser is disadvantageous insofar as it is associated with increased effort for an exact positioning of the electrical contact part under the bending die (crimp die) in order to thus keep the reflection properties and/or absorption properties of the crimp flanks constant and reproducible.

By a displacement of crimp flank material during the curling of the flank into the whole of the crimp die, a "formation of warts" can occur. By this, the reflection behavior and/or absorption behavior of the crimp flanks can change and with this the welding quality. In the worst case, a welding of the crimp flanks can also occur on the crimp die. A "formation of warts" can be prevented by changing the design of the electrical contact part, however this is associated with an increase of the part price owing to the creation of an additional contact variant.

And a reduction of the hole in the crimp die would in turn lead to the welding of the contact part to the crimp die (bending die).

According to the invention, a crimp welding occurs from below by the anvil or plunger 22. There can also be success owing to a corresponding welding depth with welding the crimp flanks 18 together from below including wire(s) 20 using a welding process.

The positioning of the electrical contact part 14 is not problematic. A larger opening 30 can be used in the anvil or plunger 22 by which a welding of the electrical contact part 14 is prevented and the quality window is increased. And standard contacts 14 can still be used.

The invention claimed is:

1. A method for connecting an electrical conductor to an electrical contact part which includes a base part and deformable flanks connected thereto, the flanks being deformable by a device which includes a bending die and a plunger having a resting region for at least one section of the base part of the electrical contact part, such that the deformable flanks force-fittingly press the electrical conductor into the contact part,
   wherein,
   at least in a lowest position of the bending die with respect to the plunger, the contact part, which is arranged at least partially between the resting region and the bending die, is acted on through the resting region of the plunger such that at least one component of the electrical conductor is materially connected to the base part and/or at least one flank, wherein the resting region of the plunger has at least one opening and wherein at least one laser beam passes through the at least one opening in the resting region and causes the material connection.

2. The method according to claim 1,
   wherein
   the electrical conductor is acted on through at least one opening in the base part of the contact part such that at least one component of the electrical conductor is materially connected to the base part and/or at least one of the flanks.

3. The method according to claim 2,
   wherein a region on which the laser beam acts has a larger surface area than an area of the at least one opening in the base part.

4. The method according to claim 1, wherein the material connection occurs, for a contact part having a longitudinal extension and a transverse extension, at least in a center region of the longitudinal extension.

\* \* \* \* \*